United States Patent [19]

Jacobsen et al.

[11] Patent Number: 6,074,754
[45] Date of Patent: Jun. 13, 2000

[54] SPHERICAL PIGMENTS, PROCESS FOR PRODUCING THEM AND USE THEREOF

[75] Inventors: Hauke Jacobsen, Rheinfelden; Werner Hartmann, Babenhausen; Stipan Katusic, Kelkheim; Andreas Schulz, Neu-Isenburg; Norbert Giesecke, Hammersbach; Ralph Brandes, Pohlheim; Jörg Sperlich, Offenbach, all of Germany

[73] Assignee: Degussa Aktiengesellschaft, Frankfurt, Germany

[21] Appl. No.: 08/970,760

[22] Filed: Nov. 14, 1997

[30] Foreign Application Priority Data

Nov. 14, 1996 [DE] Germany .......................... 196 47 038

[51] Int. Cl.$^7$ ...................................... B32B 5/16
[52] U.S. Cl. .................... 428/403; 427/215; 427/218; 428/325; 428/328; 428/331; 428/404; 428/406
[58] Field of Search ...................... 428/403, 404, 428/323, 328, 331, 325, 406; 427/215, 218

[56] References Cited

U.S. PATENT DOCUMENTS

| | | | |
|---|---|---|---|
| 5,252,522 | 10/1993 | Dorbath et al. | 501/19 |
| 5,340,746 | 8/1994 | Hagen et al. | 436/109 |
| 5,470,532 | 11/1995 | Hagen et al. | 422/57 |
| 5,589,273 | 12/1996 | Dorbath et al. | 428/433 |
| 5,707,436 | 1/1998 | Fritsche et al. | 106/403 |

FOREIGN PATENT DOCUMENTS

| | | |
|---|---|---|
| 0 371 211 | 6/1990 | European Pat. Off. . |
| 0606187 | 7/1994 | European Pat. Off. . |
| 0 681 989 | 11/1995 | European Pat. Off. . |
| 4106520 | 9/1992 | Germany . |
| 4 307 333 | 9/1994 | Germany . |
| 4 411 104 | 10/1995 | Germany . |
| 8-91874 | 9/1996 | Japan . |

OTHER PUBLICATIONS

Labeau et al., "Synthesis of pure and Pd–doped and SnO$_2$ particles", Solid State Ionics 63–65 (1993) 159–163.
Patent Abstracts of Japan, vol. 017, No. 663 (C–1138), Dec. 8, 1993 & JP 05 214262 A (KAO CORP), Aug. 24, 1993.

Primary Examiner—Hoa T. Le
Attorney, Agent, or Firm—Wenderoth, Lind, Ponack, L.L.P.

[57] ABSTRACT

The invention relates to pigments consisting of substantially spherical particles with a mean particle diameter of less than 10 μm, on the basis of an oxidic or silicate substrate material with noble metal distributed extremely finely on and/or in the particles. Preferred pigments are purple-colored and are based on an oxide from the series SiO$_2$, SnO$_2$ and ZrO$_2$ and gold as noble metal. The pigments are suitable for the production of ceramic decorations and for the dyeing of plastics, synthetic films and fibers as well as lacquers. Exceptional application properties are obtained by virtue of the spherical shape. The pigments are obtainable by a spray-pyrolysis process in which an aerosol consisting of a solution of at least one noble metal compound and an oxide- or silicate-forming precursor is subjected to pyrolysis; the pigment is separated from the pyrolysis gas.

28 Claims, 2 Drawing Sheets

SPHERICAL PIGMENTS, PROCESS FOR PRODUCING THEM AND USE THEREOF

The invention relates to pigments consisting of substantially spherical pigment particles on the basis of an oxidic or silicate substrate material containing finely-divided noble metal. Purple-colored pigments in particular are involved. It further provides a process for producing pigments according to the invention and the use thereof.

BACKGROUND OF THE INVENTION

Purple-colored pigments on the basis of colloidally distributed elemental gold in an oxidic or silicate matrix, such as glass frits, are known. Purple pigments of this kind can be produced, for example, by the reductive precipitation of gold from an aqueous gold salt solution in the presence of glass frits or a metal oxide or by the precipitation of Cassius purple, mixing of the latter with glass frits or a metal oxide, presintering at 600 to 800° C. and subsequent milling of the sintered material. According to DE-OS 44 11 104 purple pigments can be produced by the bringing of a finely powdered silicate or oxidic substrate material into contact with one or more gold compounds and subsequent thermal treatment of the mixture at 150 to 300° C. It is common to the purple pigments produced according to the aforementioned process principles that they are not spherical, but exhibit the irregular surface structure known from the oxidic or silicate matrix, such as glass frits, used. According to DE-PS 32 29 837 plate-like particles coated with metal oxides can also be converted into cerise pigments by tempering at 600° C. after treatment with an organic gold resinate solution. The plate-like structure is retained in said process.

Pigments as finely dispersed as possible are of interest whenever the materials to be pigmented represent very thin decorative layers, films or fibers. In order to achieve the desired fine dispersion in the case of inorganic pigments, laborious milling processes are often required. The technical complexity increases with decreasing mean grain diameter, and pigments according to the preamble with a mean grain diameter of about 1 $\mu$m or less are, for practical purposes, no longer obtainable by the conventional size-reduction techniques. There is in addition the risk of the color of the pigment being modified by rubbing from milling auxiliaries employed and the mills used. The pigments obtained by conventional methods have an irregular shape with many broken edges. Such pigments, even if they possess a high degree of fineness and a narrow grain spectrum, cause problems in the spinning of materials dyed with them. With melt spinning, for example, corrosion phenomena on the spinning nozzles and/or other defects, such as clogging of the spinning nozzles, are found. Corrosion phenomena of this kind have limited the use of conventional pigments of non-spherical shape to date.

In order to avoid application problems due to the irregular shape of the pigments, there is a requirement for pigments with as spherical a habit as possible, which should exhibit, in the event of a very small mean grain diameter, for example one in the range from 0.1 to 10 $\mu$m, and preferably, in addition, a very narrow grain spectrum.

Metallic and ceramic spherical particles in the few microns to sub-micron range are available by means of the so-called spray-pyrolysis technique. In this technique an aerosol consisting of a solution or suspension of materials from which the fine powder to be produced can be formed is introduced into a heated reactor, wherein the solvent or suspension agent is evaporated and solid residue particles are formed, which for their part can be converted into the desired product by a decomposition and/or another chemical reaction. Spherical glass powders with a particle diameter of between 0.1 and 5 $\mu$m are obtainable according to JP-A 08091874 by the injection of fine drops of one or more solutions of precursors of the metal oxides contained in the glass into a flame at 800 to 1800° C. and subsequent rapid cooling. According to EP-B 0 371 211 there can be obtained, by injection of an aqueous solution containing various metal salts into a pyrolysis reactor, with hydrogen being used as spray gas, ceramic powders consisting of spherical particles with a particle diameter in the range from 0.1 to 3 $\mu$m. According to EP-A 0 681 989 it is also possible to introduce the aerosol into an independently operated detonating gas flame, wherein a lower flame temperature is adjustable and hence other modifications are obtainable. A further modifying is taught in DE-OS 43 07 333, according to which an aqueous solution of the metal compounds which is dispersed in an organic phase is fed to the pyrolysis reactor in aerosol form. According to J. Chem. Soc. Japan (1987), Vol. 12, pp. 2293–2300 it is also possible to pass an aerosol of an aqueous solution of a noble metal salt into a hydrogen-oxygen flame (detonating gas flame), wherein noble metal powders are obtained. While the aerosol pyrolysis is carried out for the most part in so-called flame pyrolysis reactors, it is also possible to carry out the pyrolysis in a furnace heated from the outside.

None of the processes known to date using aerosol pyrolysis is directed to the production of pigments on the basis of an oxidic or silicate substrate material with noble metal particles distributed extremely finely on/or in the particles. The object of the present invention is consequently the provision of such pigments consisting of substantially spherical pigment particles, also described simply as spherical pigments below.

DESCRIPTION OF THE INVENTION

Pigments consisting of substantially spherical particles with a mean particle diameter of less than 10 $\mu$m on the basis of an oxidic or silicate substrate material with noble metal distributed extremely finely on and/or in the particles were found.

The pigments contain one or more noble metals from the series Ag and Au as well as Ru, Rh, Pd, Os, Ir and Pt, preferably Au, Ag, Pd and Pt, in elemental form and extremely fine distribution—the noble metal particles are colloidal in size. The noble metal particles can be located within and/or on the surface of the spherical substrate material. By treatment of a purple-colored pigment according to the invention on the basis of $SiO_2$/Au (Example 1) in aqua regia, the gold located on the surface dissolves; since the remaining pigment is still purple-colored, although brighter compared with the initial pigment, part of the gold is still located within the particles. A purple-colored pigment based on $SnO_2$/Au (Example 2) contained on the other hand the greatest part of the gold on the surface. It is assumed that the formation of extremely fine gold particles on the surface of the particles is a result of partial evaporation of the noble metal during the production process with subsequent separation and adsorption on the substrate material. Even if, according to previous investigations, the noble metals are contained for the most part in elemental form in the pigments, oxidation numbers other than 0 are not excluded. Pd can also be present as PdO in pigments according to the invention.

The noble metal content of the pigments lies in general between 0.1 and 40 wt %, calculated on the pigment, preferably in the range from 0.5 to 25 wt %, calculated on the pigment.

Preferred spherical pigments are purple-colored and contain, as noble metal, gold and optionally in addition silver and/or platinum for tint modification. The amount of tint-modifying noble metals used is preferably less than 50 wt %, calculated from the gold content; preferably the amount of silver and/or platinum used lies in the range up to about 10 wt %, calculated from gold. Pigments according to the invention, which contain go substantially silver as noble metal, for instance those based on $ZrO_2/Ag$, are pink-colored. Pigments based on $SiO_2/Pd$ or $Al_2O_3/Pd$ are a neutral grey. In addition, the pigments can contain a small quantity of color-imparting metal oxides for the purpose of further tint modification. The color of purple pigments based on Au is shifted towards blue by the presence of, for example, Co oxides.

Figure 1:
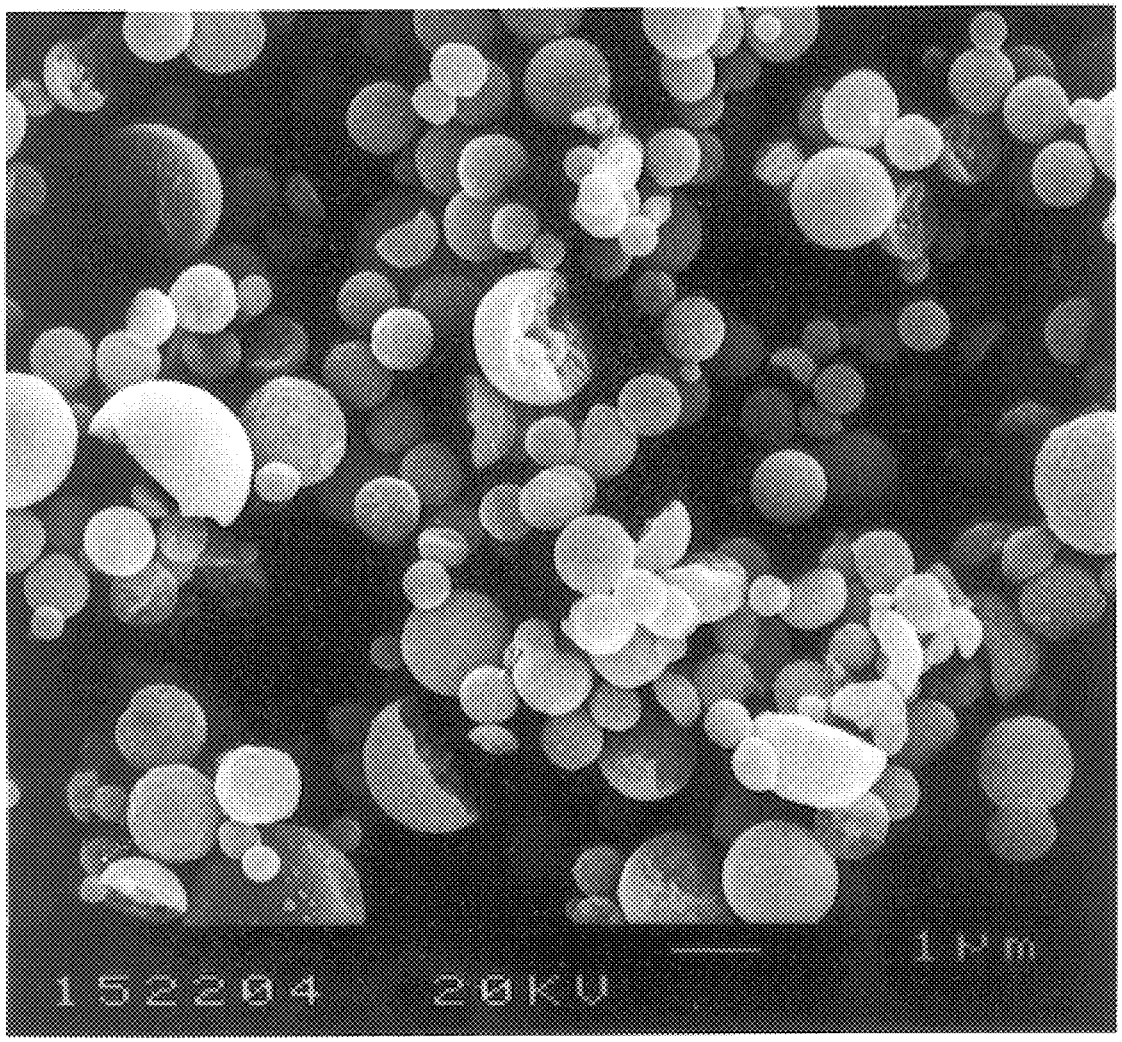
FIG. 1 is an SEM shot of the pigment of Example 3.

The spherical shape of pigments according to the invention follows from FIG. 1, which shows an SEM shot of the purple pigment according to Example 3 with gold as colloidally distributed noble metal and $ZrO_2$ as substrate material. The term "substantially spherical" also includes pigment particles which have a deformed spherical shape, due for instance to the formation of individual crystal faces, as well as broken spheres such as can be seen in FIG. 1. A deformation of the spherical form by crystallization of the substrate material was observed, e.g., for a pigment based on $SnO_2/Au$ (Example 4).

The mean particle diameter of pigments according to the invention is less than 10 $\mu$m. It preferably lies in the range between 0.5 and 5 $\mu$m and, in particular, between 1 and 3 $\mu$mm. With advantage the particle spectrum of the pigment is very narrow. Preferably 100% of the pigment particles are substantially smaller than 10 $\mu$m. Particularly preferably 80% of the particles have a particle diameter in the range from 0.5 to 5 $\mu$m.

The oxidic or silicate substrate material on which the spherical pigments are based is substantially colorless. The term "substantially" means here that the presence of tint-modifying oxides, mixed oxides or silicates in an amount up to not more than 10 wt %, in particular not more than 5 wt %, calculated on the pigment, is not excluded. Metal oxides from the second to fifth main group and second to sixth sub-group of the periodic table can be used. Examples of suitable oxides from the series of the oxides of the main group elements are $MgO$, $CaO$, $Al_2O_3$, $SiO_2$, $SnO_2$ and $Bi_2O_3$; suitable metal oxides from the series of the sub-group elements are $ZnO$, $Y_2O_3$, $La_2O_3$, $TiO_2$, $ZrO_2$, $Nb_2O_5$, $Ta_2O_5$ and $WO_3$. Instead of simple oxides, mixed oxides can also form the basis of the substrate material; examples of this are colorless spinels, such as in particular $MgAl_2O_4$. The silicate substrate material can consist of simple metal silicates, such as Al silicates and $ZrSiO_4$, or silicates that contain several metal cations; silicate glasses, for instance borosilicate glasses, are also suitable.

The spherical pigments according to the invention are obtainable by a process which embraces the steps:

(i) A preparation of a solution, suspension or emulsion containing one or more noble metal compounds, (ii) conversion of the solution, suspension or emulsion into an aerosol, (iii) introduction of the aerosol into a directly or indirectly heated pyrolysis reactor to which are simultaneously fed in aerosol form one or more precursors forming an oxidic or silicate substrate material under pyrolysis conditions, (iv) carrying out of the pyrolysis at a temperature above the decomposition temperature of the noble metal compounds and at least the temperature of formation of the substrate material consisting of the oxide- or silicate-forming precursors, and (v) separation of the pigment from the pyrolysis gas.

Preferably the solution, suspension or emulsion containing noble metal compounds of stage (i) contains simultaneously also the oxide- or silicate-forming precursors, so that only an aerosol of uniform composition is fed to the pyrolysis reactor. With advantage the aerosol is pre-dried prior to the introduction into the pyrolysis reactor.

In the pyrolysis reactor the following steps take place in the individual particles: decomposition of the noble metal compound to the noble metal, the decomposition and/or oxidation of the oxide- or silicate-forming precursors and sintering with formation of the oxide or silicate. Optionally part of the noble metal also evaporates in order to be deposited on substrate particles again in colder zones. Spherical particles with small specific surface are obtained as a result of the pyrolysis. The size distribution of the pigment particles obtained follows substantially directly from the droplet spectrum of the aerosol fed to the reactor and from the concentration of the solution used or, if a suspension or emulsion is fed to the reactor, also from the degree of dispersion.

The heating of the reactor can take place directly, namely by means of a flame, or else can indirectly from the outside, for example by means of an electric furnace. Because of the temperature gradient from the outside to the inside required in the case of indirect heating, the furnace must be substantially hotter than corresponds to the temperature required for the pyrolysis. An indirect heating requires a temperature-stable furnace material and an elaborate reactor design, otherwise the total amount of gas is lower than in the case of a flame reactor. Conventional combustible gases can be employed for the indirect heating, but preferably hydrogen is used (a hydrogen-air flame reaches a temperature of not more than 2045° C.). The temperature in the reactor can be controlled by the ratio of the amount of combustible gas to that of the total gas. In order to keep the total amount of gas low and hence achieve as hot a temperature as possible, the reactor can, instead of air as $O_2$ source for the combustion of the combustible gas, also be fed with oxygen. The total amount of gas includes also the carrier gas for the aerosol and the gas from the evaporation of the solvent of the aerosol, for instance $H_2O$. This embodiment is preferred in view of the simplified design of a furnace with direct heating. The aerosol or aerosols to be fed to the reactor are, with advantage, passed directly into the flame. While air is preferred for the most part as carrier gas for the aerosol, it is also possible to use nitrogen, $CO_2$, $O_2$ or a combustible gas, i.e. for example hydrogen, methane, propane or butane.

The temperature in the reactor lies above the decomposition temperature of the metal compounds, namely at a temperature adequate for the oxide or silicate formation, conventionally in the range between 500 and 2000° C., preferably between 800 and 1300° C. A temperature gradient is formed inside the reactor constructed conventionally in a tube shape. Depending on the temperature of the flame, there can be obtained, assuming identical aerosol composition, pigments with varying modification and hence varying color. The pyrolysis gas is in general partly cooled prior to the separation of the pigment particles contained in it. It is possible by rapid cooling to freeze a high-temperature modification temporarily formed. With advantage the pyrolysis gas is cooled prior to the to such an ex the particles to such an extent that a sintering together of the particles is excluded. The maximum temperature prior to the separation of the particles is substance-specific. In general a cooling to a temperature of some 500° C. is sufficient.

After the formation of the spherical pigment particles the latter can, if desired, be further treated for the purpose of modification of the surface properties. For example, such an after treatment can be a water-repellency treatment, which follows directly on from the formation of the particles, optionally after partial cooling of the pyrolysis gas, or is carried out after separation of the particles.

The noble metal compounds and oxide- or silicate-forming precursors are fed to the reactor in the form of one or more aerosols. It is particularly advantageous to feed to the reactor an aerosol that has been obtained by nebulization of a solution which contains one or more noble metal compounds or one or more oxide- or silicate-forming precursors. In this way it is ensured that the composition of the pigment particles produced is homogeneous.

The noble metal compounds and the oxide- and silicate-forming precursors can be converted into an aerosol in the form of a solution, a suspension or an emulsion. The use of a suspension is advisable only if the size of the undissolved particles is significantly less than the particle size of the droplets of the aerosol. If an emulsion is converted into an aerosol, the emulsion involved is an aqueous-organic system, wherein the noble metal compounds and oxide- or silicate-forming precursors are, with advantage, dissolved in the aqueous phase. Compared with the particularly preferred embodiment of the invention, according to which a solution containing the noble metal compounds and oxideor silicate-forming precursors is converted into an aerosol, the use of the above-mentioned emulsion is of advantage only if products with particle sizes in the sub-micron range are to be produced.

Both organic and aqueous solvent systems can be utilized to produce the solution, suspension or emulsion required for forming the aerosol. Preferred are aqueous solvent systems, such as mixtures of water and water-soluble alcohols, ketones, carboxylic acids or ethers. Particularly preferred, however, is a solvent system consisting substantially of water. As well as the obvious economic aspects, the preference for substantially water as solvent can also be ascribed to the fact that problems of a discoloration of the pigments by unburnt carbon included in certain cases are thereby avoided.

Suitable for the production of a solution of one or more noble metal compounds in an organic or organic-aqueous solvent system are noble metal resinates and thiolates known from the decoration sector. Compounds of this kind are used as components, for example, of bright gold preparations. Since aqueous solutions, which can in any case contain small amounts of organic solubilizers, are preferred for forming aerosols, the selection of the noble metal compounds is directed mainly towards compounds with sufficient water solubility. Water-soluble gold compounds which are suitable for the production of preferred purple pigments can be selected for example from the series lithium, sodium and potassium dicyanoaurate(I), tetrachloroauric acid and hydrates thereof, lithium, sodium and potassium disulphitoaurate(I) and substantially water-soluble gold(I) thiolates and dithiolates.

The gold(I)thiolates are systems with the general formula Au—S—R—H and Au—S—R—X as well as salts of said compounds, in which R stands for an aliphatic, aromatic or heterocyclic group and X for a water-solubilizing group, in particular —COOH, —SO$_3$H and —NH$_2$ or a salt thereof. Suitable compounds with the aforementioned formulae are known from EP-A 0 514 073. Preferred gold(I) thiolates are those of the following thiols: N-(2-mercaptopropionyl) glycine, N-(3-mercaptopropionyl)glycine, N-(2-mercaptoacetyl)glycine, 2-mercaptoacetyl-histidine, 3-mercaptopropionylhistidine, L-cysteine, N-acetylcysteine, glutathione, 2-mercaptoethane sulphonic acid, 2-mercaptopyridine and mercaptosuccinic acid. Gold(I) thiolates of mercaptocarboxylic acid esters can also be used.

The water-soluble gold(I)dithiolates are compounds with the general formula

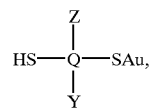

such as are known from EP-A 0 668 265. Here Q signifies a tetravalent organic group with 2 to 10 C-atoms, Y is a hydrophillic group, in particular —COOH and —COO$^-$ cat$^+$, where cat$^+$ is Li$^+$, Na$^+$, K$^+$, NH$_4^+$ or (C$_1$- to C$_3$-alkyl)n N$^+$H$_{(4-n)}$, and Z is identical to Y or H or another hydrophillic group from the Y series. Preferred gold(I) dithiolates are monogolddimercapto-succinic acid, monogold-2,3-dimercapto-1-propane sulphonic acid and monogold-a,a'-dimercaptoadipic acid as well as their alkali metal salts or ammonium salts.

As regards water-soluble noble metal compounds with noble metals other than gold, compounds with a comparable structure to that of the gold compounds are considered. Silver nitrate is however preferred as a silver compound.

Precursors for the oxide- and silicate-forming substrate materials are in particular those which are water-soluble directly or after addition of a small amount of an organic solubilizer. Precursors which are soluble in the required concentration are particularly preferably used. Halides and nitrates are the preferred oxide-forming precursors of the second and third main group and sub-group; acetates of these elements are also usable, in the case of aluminum also the sulphate; elements of the above-mentioned main and sub-groups can furthermore also be used in the form of known complexes and chelate complexes.

Among silicon compounds, organosilanes soluble in organic solvents are considered as precursors for SiO$_2$, together with reaction products of SiCl$_4$ with lower alcohols or lower carboxylic acids. A water-soluble organosilane containing at least one water-solubilizing functional group can be used as a water-soluble silicon source. Preferably a water-soluble organosilane or organosilanol with the general formula (RO)$_3$Si—(CH$_2$)$_n$—X or [(RO)$_3$Si—(CH$_2$)$_m$—NR'$_3$]$^+$A$^-$ is used, where R and R' can be the same or different and preferably stand for H, methyl or ethyl, n stands for the number 1, 2 or 3, m for the number 2 or 3, X for the group —COOH or —SO$_3$H or a salt thereof and A$^-$ for an anion, in particular chloride. In addition, water-soluble condensates of the above-mentioned organosilanes or silanols with Si—O—Si members can also be used.

Suitable in particular as a water-soluble precursor for SiO$_2$ is a hydrate of tin tetrachloride, optionally also a hydrate of tin disulphate. Suitable in particular as precursors for the oxides of the elements of the fourth sub-group are titanium tetrachloride, zirconium tetranitrate or zirconyl chloride (ZrO Cl$_2$. 8 H$_2$0), as well as the corresponding hafnium oxychloride-hydrate. Suitable in particular as precursors for colorless metal oxides of the fifth main and sub-group, i.e. in particular $Bi_2O_3$ as well as $Nb_2O_5$ and $Ta_2O_5$, are $Bi(NO_3)_3$, $TaF_5$ or $Ta_2O_5 \cdot xH_2O$ (tantalic acid). Suitable as precursors for tungsten oxide are tungsten acid or tungsten dioxydichloride.

To produce mixed oxides as substrate material for the pigments according to the invention, corresponding water-soluble metal compounds are used in a stoichiometric ratio in the solution such as corresponds to the stoichiometric ratio of the metal atoms in the mixed oxide. To produce the spinel $MgAl_2O_4$, the solution to be converted into an aerosol accordingly contains for example magnesium nitrate and aluminum nitrate in a molar ratio of 1 to 2.

To produce pigments with a silicate substrate material, the solutions to be converted into an aerosol contain both a source for $SiO_2$ and at least one source for a further metal oxide. The aforementioned sources for the metal oxides and $SiO_2$ can be used in this case. The sources for $SiO_2$ and the further metal oxide or oxides are to be used in the aqueous or aqueous/organic solution in the desired stoichiometric ratio. To produce a silicate substrate material from the series of the glasses, in particular borosilicate glasses, corresponding sources for $SiO_2$, $B_2O_3$, $Al_2O_3$, RO and $R'_2O$, wherein R stands for an element of the second main or sub-group and R' for an alkali metal, are dissolved in an aqueous solution in the desired molar ratio. Suitable in particular as a source for $B_2O_3$ is tetraboric acid ($H_2B_4O_7$).

In the preparation of the aqueous solution to be converted into an aerosol, the person skilled in the art will preferably select the individual components in such a way that both the oxide- and silicate-forming precursors contained in the solution and the noble metal compounds used exist side by side homogeneously dissolved up to the nebulizing of the aqueous solution. If individual components are present in the solution in suspended form, it has to be ensured that the particle size is smaller than that of the droplets obtained during the nebulizing.

The noble metal compounds and oxide- or silicate-forming precursors are with advantage used in a molar ratio in the range from 1 to 3 to 1 to 100, wherein, however, higher and smaller molar ratios are not excluded. Preferred is a molar ratio in the range between 1 to 5 and 1 to 50. To produce purple-colored pigments on the basis of colloidally distributed gold, a gold compound and an oxide- or silicate-forming precursor are used in the aqueous solution in a ratio such that the pigment contains gold in an amount between 0.1 and 40 wt %, in particular between 0.5 and 25 wt %.

Figure 2:
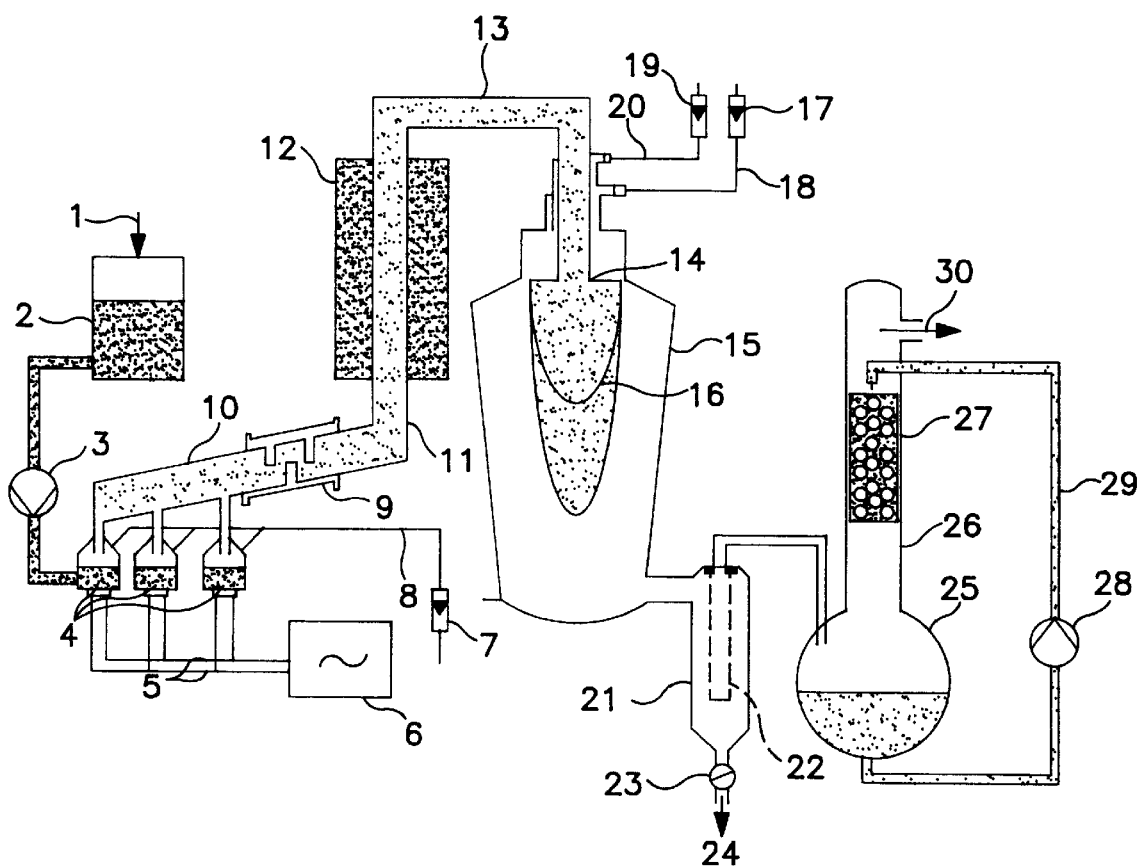
FIG. 2 is a diagrammatic representation of an apparatus for carrying out the process of the invention.

The principle of a preferred embodiment of an apparatus for carrying out the process according to the invention follows from the diagrammatic representation of FIG. 2. Substantial elements of the apparatus are a storage tank (2) for the liquid to be nebulized, a high-frequency generator (6) with associated ultrasonic oscillators (4), a droplet separator (9), a predrier (11 with 12), the actual pyrolysis reactor (15) with feed lines for the predried aerosol (13 with 14), the combustible gas (20) and the air or oxygen (18), an apparatus for the gas-solid separation (21), incorporating a filter element (22) and an extraction device for the solid (23 with 24), a scrubbing apparatus for the reaction gas freed of solids, comprising a bubble (25) and a scrubbing column (26) filled with fillers (27), a recycling line (29) with a recycling pump together with a discharge point for the waste gas. The list of reference symbols should be consulted for further details.

List of reference symbols
1 feed line
2 storage tank
3 pump
4 ultrasonic oscillator (transducer with container and carrier gas feed nozzle) (=aerosol generator)
5 control lines to the oscillators
6 high-frequency generator
7 rotameter
8 gas line for carrier gas
9 drop separator
10 header
11 predrier
12 heater assembly
13 aerosol feed to the reactor
14 nozzle
15 pyrolysis reactor
16 flame
17, 19 rotameter
18 gas line for air or $O_2$
20 gas line for $H_2$
21 separator
22 filter element
23 shut-off valve
24 pigment discharge
25 bubble
26 column
27 column fillers
28 recycling pump
29 recycling line
30 waste gas line For the conversion of the solution containing one or more noble metal compounds and one or more oxide- or silicate-forming precursors into a fine mist, conventional nebulization devices are considered, which however differ as regards the attainable drop size, the size distribution of the drops, the throughput, the fluid-propellant gas ratio and the discharge velocity. Two-fluid nozzles are capable of handling large amounts of fluid; the smallest attainable mean droplet size is conventionally about 10 $\mu$m; to produce a particularly fine pigment powder, a more strongly diluted solution must be used in certain cases. It is possible by means of ultrasonically supported nozzles to achieve a higher droplet fineness, so that powders with a grain diameter of less than 1 $\mu$m are also obtainable. It is possible by means of a gas-propelled aerosol generator, for example a Collison® nebulizer, to obtain a very fine droplet spectrum in the region of 3 $\mu$m, but the ratio of carrier gas to amount of fluid is unfavorable, so that only small output rates can be achieved. It is possible by means of electrostatic spraying methods to produce mist in the sub-micron range, but only a low throughput can be achieved with currently known systems. The preferred nebulizers are ultrasonic nebulizers, with which mists with a droplet size of some 3 to 4 $\mu$m are obtainable without difficulty. With ultrasonic nebulizers it is moreover possible without difficulty to vary at will the ratio of gas to fluid. In order to obtain an adequate throughput, it is possible to couple several ultrasonic oscillators to one another. The operating principle of an ultrasonic nebulizer rests on the conversion of mechanical (sound) energy into surface energy of the solvent. An ultrasonic oscillator (transducer), a flat round disc of piezoceramic material, is excited into thickness-mode oscillation by high-frequency excitation. The oscillation is transmitted onto the liquid column standing above a hemispherical section, at the surface of which liquid column a fountain is produced by cavitation effects, which decomposes into extremely fine droplets. Care must be taken when selecting the oscillators that corrosion phenomena do not occur with the often acid solutions; silicon-coated oscillators have proved satisfactory. The oscillators are fixed to the bottoms of the mutually connected containers at an angle of a few degrees (the connection lines between the ultrasonic oscillators shown in FIG. 2 (transducers with container) are not shown for reasons of clarity). The amount of liquid consumed by nebulization is replenished from a storage tank (2) with the liquid maintained at a constant level. Each aerosol generator is supplied separately with carrier gas, which is fed via a rotameter (7) and line (8). The individual aerosol flows of the aerosol generators are united in a header (10). If the droplet spectrum of the aerosol sometimes contains excessively large droplets, which would lead to excessively large solid particles, it is advisable to separate excessively large droplets by means of a droplet separator (9). It is advisable to construct the droplet separator in such a way that droplets with a diameter of more than 10 $\mu$m, in some cases also a maximum droplet diameter in the range between 5 and 10 $\mu$m, to be separated and the solution to be returned into the generator. The function of the droplet separator rests on an acceleration of the aerosol and a subsequent deflection of the flow, wherein the large droplets are separated on a plate lying at right angles to the flow. The separation rate can be up to 50% and more, depending on the maximum droplet diameter desired.

In order to obtain solid particles as spherical as possible, it has proved to be advantageous to predry the aerosol prior to the entry into the pyrolysis reactor, for example in a flow pipe (11) with a heater assembly (12) disposed around it. The process steps occurring in the droplets, namely evaporation of the solvent, precipitation of the precursors of the oxide- or silicate-forming material and of the noble metal compound, drying, decomposition and subsequent sintering, require different periods of time, of which the evaporation of the solvent is the slowest step. It is therefore beneficial to predry the aerosol wholly or partially in a drying apparatus, for example a heated pipe, disposed downstream of the flame reactor. If predrying is not carried out, there is the danger that a product with a broader grain spectrum and in particular excessive fine material will be obtained. The temperature of the predrier is determined by the concentration of the dissolved precursors and also by the choice of the latter. Conventionally the temperature in the predrier lies above the boiling point of the solvent up to 250° C.; with water as solvent the temperature in the predrier preferably lies between 120 and 250° C., in particular between 150 and 200° C.

The predried aerosol fed to the pyrolysis reactor (15) via a line (13) enters the reactor via an outlet (14). In the embodiment shown in the figure the hydrogen fed via a rotameter (19) and a line (20) enters through a concentric ring placed around the aerosol feed line. The secondary air fed via a rotameter (17) and a line (18) is introduced through a further concentric ring. Balanced pulse flow densities are obtained by means of this arrangement. The nature of the feeding of the aerosol, of the combustible gas and of the secondary air is however not limited to the embodiment shown in the figure. To generate a flame (16), the reactor contains in addition an ignition device (not shown in the figure). In order to produce a balanced temperature profile, the combustion chamber, which is preferably of tubular construction, is insulated (not shown). The combustion chamber of the reactor is bordered by a cooling zone; in the reactor according to FIG. 2 the cooling zone is the lower (flame-free) part of the reactors.

The reaction gas containing solid particles enters, after leaving the reactor in partially cooled form, an apparatus (21) for separating the solid particles from the reaction gas. Said separation apparatus incorporates a filter element (22) and a shutoff valve (23), which leads to the pigment discharge (24). Advantageous filter elements are sintered metal filters and ceramic filters, the latter being particularly preferred, since they are usable up to 500° C. and long cooling zones can be avoided. The waste gas passing through the filter element is scrubbed in a scrubbing apparatus (25 to 29) and exits via the waste gas line (30). If all the solid particles, and hence also noble metals, have not been able to be retained by means of the separation apparatus, said substances accumulate in the scrubbing liquid and can be fed to a preparation unit.

The process according to the invention permits the production of pigments consisting of substantially spherical particles, wherein the mean grain size and the grain size distribution can easily be set by the process parameters. Milling processes required to date during the pigment production are superfluous.

The spherical pigments according to the invention can be used for the production of ceramic decorations and for the dyeing of plastics, synthetic films and fibers. Because of the high dispersibility of the pigments, they can be mixed in the dry state with other components of dyes with an application-specific composition. Milling processes conventional to date are superfluous; consequently a contamination due to the milling aggregates, and hence the risk of discoloration of the pigment, also do not arise. Because of the high dispersibility it is also possible to achieve extremely thin decorative layers and to dye films and fibers during their production process. A further advantage is the improved screen printability of color pastes containing color pigments according to the invention, by the achievement, due the spherical shape of the pigment in conjunction with the narrow grain spectrum and the almost total absence of oversize material with a diameter of more than 10 $\mu$m or even more than 5 $\mu$m, of an improved underflow. Due to the dispersibility of the pigments, in conjunction with their spherical shape, operating faults and corrosion phenomena on spinning nozzles and outlets are avoided during the production of films and fibers.

The invention will be explained in greater detail from the following examples.

EXAMPLES 1 to 6

The production of various pigments took place in an apparatus according to FIG. 2, so that the description of the apparatus will not be repeated.

Use was made in all the examples of aqueous solutions containing both a noble metal compound and an oxide-forming precursor. The compositions of the solutions are given in Table 1. The carrier gas for the aerosol was air, the combustible gas was hydrogen. The droplet separator recycled droplets with a diameter of more than 8 $\mu$m. The temperature in the predrier came to 150° C. in Examples 1 to 3 and 5 to 6 and 200° C. in Example 4.

Reactor: Reactor length 900 mm, mean width 125 mm, aerosol nozzle in the reactor d=46 mm; $H_2$ ring nozzle from 52 to 54 mm; air ring nozzle from 61 to 80 mm. The reactor contained a temperature measuring probe in the upper (To), central (Tm) and lower (Tu) third. In Example 4 the temperatures came to To=836° C., Tm=761° C., Tu=514° C.

The pyrolysis gas was cooled to about 500° C. in the lower part of the reactor. Thereafter the pigment was separated from the pyrolysis gas by means of a ceramic filter.

The physical data on the pigments obtained, including the color data, are given in Table 2. FIG. 1 shows an SEM shot of the pigment of Example 3. The coloristic testing of the pigments produced took place by direct printing, and partly also by indirect printing (transfer picture technique).

The pigments were each mixed in the conventional manner with a flux (No. 10150 of Cerdec AG) in the ratio 1 to 9 and made into a paste with a medium (No. 80820 of Cerdec AG).

The colors or the transfer pictures were applied to earthenware or porcelain and annealed: pre-heating time 400 K/min, firing temperature 800° C., holding time 12 min. The color value measurement took place according to CIELAB (DIN 6174).

TABLE 1

Pigments - Production

| Example No. | 1 | 2 | 3 | 4 | 5 | 6 |
|---|---|---|---|---|---|---|
| Noble metal compound | $HAuCl_4$ | $HAuCl_4$ | $HAuCl_4$ | Au-NAC**) | $AgNO_3$ | $AgNO_3$ |
| Oxidic precursor | Silane 285*) | Silane 285*) | $Zr(NO_3)_4$ | $SnCl_4 \times H_2O$ | $Zr(NO_3)_4$ | $Zr(NO_3)_4$ |
| Batch solution Molar ratio | | | | | | |
| Noble metal compound to oxidic precursor | 1:7 | 1:27 | 1:34 | 1:34 | 1:25 | as Example 6 but with acid wash |
| Solvent | $H_2O$ | $H_2O$ | $H_2O$ | $H_2O$ | $H_2O$ | |
| g noble metal/ 1 solution | 22 | 5.9 | 4.3 | 0.94 | 1.7 | of the pigment |

*)Silane 285 = $(HO)_3Si-(CH_2)_3-SO_3H$
**)Au-NAC = sodium salt of the Au-thiolate of N-acetylcysteine

TABLE 2

Pigments - physical data

| Example No. | 1 | 2 | 3 | 4 | 5 | 6 |
|---|---|---|---|---|---|---|
| Color | | purple | | | pink | |
| Noble metal | Au | Au | Au | Au | Ag | Ag |
| Noble metal content (wt. %) | 22.76 | 7.23 | 6.74 | 1.2 | 3.66 | 1.92 |
| Substrate material | $SiO_2$ | $SiO_2$ | $ZrO_2$ | $SnO_2$ | $ZrO_2$ | $ZrO_2$ |
| Direct printing on earthenware | | | | | | |
| L* | 44.22 | 44.53 | 59.04 | | 86.8 | 84.9 |
| a* | 10.54 | 9.44 | 13.83 | | 5.77 | 7.68 |
| b* | 1.23 | -0.9 | -2.24 | | 4.19 | 4.91 |
| C (Chroma) | 10.61 | 9.48 | 14.01 | | 7.13 | 9.11 |
| H (tone angle) | 6.66 | 354.55 | 350.8 | | 35.99 | 32.59 |
| Indirect printing on porcelain | | | | | | |
| L* | | | 59.52 | 50.75 | 78.96 | 77.24 |
| a* | | | 7.21 | 22.41 | 3.02 | 4.75 |
| b* | | | -0.83 | -4.16 | 2.39 | 2.78 |
| C (Chroma) | | | 7.16 | 22.8 | 3.85 | 5.5 |
| H (tone angle) | | | 353.43 | 349.48 | 38.36 | 30.34 |

What is claimed is:

1. A pigment consisting essentially of substantially spherical particles, with a mean particle diameter of less than 10 μm, which consist essentially of an oxidic or silicate substrate material with noble metal of colloidal size distributed on and/or within the particles, wherein the pigment is purple-colored and contains as noble metal gold and optionally additionally silver and/or platinum.

2. A pigment according to claim 1, which contains as oxidic substrate material one selected from the group consisting of $SiO_2$, $SnO_2$, $TiO_2$, $ZrO_2$, $Al_2O_3$, $MgAl_2O_4$, $Ta_2O_5$ and $Bi_2O_3$ and as silicate substrate material one selected from the group consisting of zirconium silicate, aluminum silicate and borosilicate glasses.

3. A pigment according to claim 2 which contains a noble metal in an amount from 0.1 to 40 wt.%.

4. A pigment according to claim 3 wherein the amount is 0.5 to 25 wt %.

5. A pigment according to claim 2 wherein 80% of the pigment particles have a particle diameter in the range of from 0.5 to 5 μm.

6. A pigment according to claims 1, which contains noble metal in an amount from 0.1 to 40 wt %.

7. A pigment according to claim 4 wherein the amount is 0.5 to 25 wt %.

8. A pigment according to claim 1,
   wherein 80% of the pigment particles have a particle diameter in the range from 0.5 to 5 μm.

9. In a coloring composition for producing a ceramic decoration or for the dyeing of a plastic, a synthetic film or a fiber, the improvement wherein said composition comprises a pigment as defined in claim 1.

10. A ceramic bearing a decoration, said decoration obtained from a composition comprising a pigment consisting essentially of substantially spherical particles, with a mean particle diameter of less than 10 μm, which particles consist essentially of an oxidic or silicate substrate material with noble metal of colloidal size distributed on and/or within the particles.

11. A dyed plastic, synthetic film or fiber wherein the color is at least in part due to a pigment consisting essentially of substantially spherical particles, with a mean particle diameter of less than 10 μm, which particles consist essentially of an oxidic or silicate substrate material with noble metal of colloidal size distributed on and/or within the particles.

12. A process for producing a pigment consisting essentially of substantially spherical particles, with a mean particle diameter of less than 10 μm, which particles consist essentially of an oxidic or silicate substrate material with noble metal of colloidal size distributed on and/or within the particles, which process comprises the following steps:

(i) preparing a solution, suspension or emulsion containing at least one noble metal compound,
   (ii) converting of the solution, suspension or emulsion into an aerosol, (iii) introducing the aerosol into a directly or indirectly heated pyrolysis reactor to which are simultaneously fed in aerosol form at least one precursor forming an oxidic or silicate substrate material under pyrolysis conditions, (iv) carrying out the pyrolysis at a temperature above the decomposition temperature of the noble metal compounds and at least the temperature of formation of the substrate material consisting of the oxide- or silicate-forming precursors, and (v) separating the pigment from the pyrolysis gas.

13. A process according to claim 12, wherein there is prepared from at least one oxide- or silicate-forming precursor, at least one noble metal compound and a solvent, a solution, converting the latter into an aerosol and said aerosol, optionally after passage through a droplet separator, is fed to the pyrolysis reactor.

14. A process according to claim 12 or 13, wherein the aerosol or aerosols are, prior to the introduction into the pyrolysis reactor, predried at a temperature in the range from above the boiling point of the solvents to 250° C.

15. A process according to claim 14 wherein the aerosol or aerosols are passed through a droplet separator prior to predrying.

16. A process according to claims 12 or 13, wherein water or a solvent mixture containing predominantly water is used as solvent.

17. A process according to claims 12 or 13, wherein the pyrolysis reactor is heated directly.

18. A process according to claim 17, wherein the direct heating is by means of a detonating gas flame ($H_2/O_2$ or $H_2$/air).

19. A process according to claims 12 or 13, wherein the noble metal compounds and oxide- or silicate-forming precursors are fed to the pyrolysis reactor in a molar ratio in the range from 1 to 3 to 1 to 100.

20. A process according to claim 19 wherein the ratio is in the range from 1 to 5 to 1 to 50.

21. A process according to claim 12 or 13, wherein there is used as $SiO_2$ or silicate-forming metal compound a substantially water-soluble organosilane or organosilanol of the general formula $(RO)_3Si—(CH_2)_n$—X or $[(RO)_3Si—(CH_2)_m-NR'_3]^+A^-$ or water-soluble condensates of said compounds, where R and R' can be the same or different and stand for hydrogen, methyl or ethyl, n stands for the number 1, 2 or 3, m for the number 2 or 3, X for the group —COOH or —$SO_3H$ or a salt thereof and $A^-$ for an anion.

22. A process according to claim 21 wherein the anion is chloride.

23. A process according to claim 12 or 13, wherein there is used for a substantially aqueous aerosol as a precursor for $ZrO_2$, zirconium tetranitrate, as a precursor for $SnO_2$, a tin tetrachloride-hydrate, as a precursor for $Al_2O_3$, aluminum nitrate, sulphate or acetate, or a hydrate of said salts.

24. A process according to claim 12 or 13, wherein there is used as noble metal compound a substantially water-soluble gold compound selected from the group consisting of (1) $HAuCl_4$, (2) $MeAu(CN)_2$ (3) $Me_3Au(SO_3)_2$, where Me stands for an alkali metal, (4) a gold-amine complex, (5) a gold(I)- thiolate and (6) a gold(I)dithiolate.

25. A process according to claim 24 wherein the gold(I) thiolate is gold(I)-N-acetylcysteine or gold(I)-propionylglycine.

26. A process according to claim 22 wherein the gold(I)-dithiolate is monogold(I) dimercapto-succinic acid.

27. A process according to claim 12 or 13, wherein a substantially aqueous solution, containing at least one noble metal compound and at least one water-soluble oxide- or silicate-forming precursor in the molar ratio 1 to 5 to 1 to 50, is converted into an aerosol by means of an ultrasonic nebulizer, said aerosol is, after passage through a droplet separator for the purpose of separating droplets with a diameter of more than about 10 $\mu$m, passed through a predrier heated to in the range from 120 to 180° C., the predried aerosol is fed to a pyrolysis reactor heated directly by means of a detonating gas flame and the pigment is separated from the pyrolysis gas by means of a sintered metal or ceramic filter.

28. In a method for the production of a ceramic decoration or for the dyeing of a plastic, a synthetic film or a fiber which comprises contacting said ceramic, plastic, synthetic film or fiber with a composition comprising a pigment, the improvement wherein the pigment is a pigment consisting essentially of substantially spherical particles, with a mean particle diameter of less than 10 $\mu$m, which particles consist essentially of an oxidic or silicate substrate material with noble metal of colloidal size distributed on and/or within the particles.

* * * * *